United States Patent

[11] 3,604,997

| [72] | Inventors | Karl Kirchner;<br>Ernst Kirchner, both of Schanzstrasse 2,<br>Friedrichshafen, Germany |
|---|---|---|
| [21] | Appl. No. | 816,251 |
| [22] | Filed | Apr. 15, 1969 |
| [45] | Patented | Sept. 14, 1971 |
| [32] | Priority | Apr. 29, 1968, Aug. 13, 1968, Jan. 28, 1969 |
| [33] | | Germany |
| [31] | | P 17 55 347.8, P 17 80 187.5 and P 19 03 990.8 |

[54] CONTROL SYSTEM FOR THE DRIVING MOTOR OF WINDSHIELD WIPERS
9 Claims, 10 Drawing Figs.

[52] U.S. Cl. .................................................. 318/443
[51] Int. Cl. ................................................... B60s 1/08
[50] Field of Search ...................................... 318/443, DIG. 2; 15/250.02

[56] References Cited
UNITED STATES PATENTS

| 3,148,399 | 9/1964 | Ziegler | 15/250.02 |
| 3,458,889 | 8/1969 | Tann | 318/443 X |
| 3,487,282 | 12/1969 | Gasiorek | 318/443 |

Primary Examiner—Oris L. Rader
Assistant Examiner—Robert J. Hickey
Attorney—Ernest F. Marmorek ABSTRACT: An intermittent windshield wiper system having a first switch actuated by a voltage drop responsive to the motor load, timing means comprising an unstable multivibrator actuated by the first switch means and controlling second switch means in series with the motor and a power source.

PATENTED SEP 14 1971

CONTROL SYSTEM FOR THE DRIVING MOTOR OF WINDSHIELD WIPERS

The present invention relates to a system for controlling the driving motor of window pane wipers, particularly of the windshield wipers of motorized vehicles, to operate either continuously or intermittently.

Continuous wiping of the windshields, for example, of automobiles is necessary at medium and heavy rain only; at light rain, snow or fog it is sufficient to clear the windshields after certain time intervals only. Intermittent wiping not only has the advantage for giving the driver a better view of the road but also of preserving the windshield and the wiper blades.

Windshield wiper drives are known wherein the wiper motor is briefly operated by pushbutton control to effect one wiper stroke. It has also been proposed to actuate a timing relay by pushbutton whereby the circuit of the wiper motor is broken at suitable time intervals. Also known is to provide a clutch between the wiper motor and the wiper shaft, comprising a gear and a rack which engages the gear in predetermined time intervals only, when intermittent wiping is desired. These conventional arrangements are expensive and subject to failure.

Another mechanical means for transmitting power from a motor to windshield wipers, which means are capable of interrupting the wiper drive, is disclosed in U.S. Pat. No. 3,241,390.

The conventional devices for driving windshield wipers render possible an intermittent operation, but do not provide for adjusting the intervals between the individual wiping operations. With mechanical devices, the wipers are started at predetermined time intervals depending on the structure of the power-transmitting means, whereas in windshield wiper apparatus provided with a timing relay the circuit of the wiper motor is broken at predetermined time intervals. Adjustment of the intermissions between wiper operations adapted to the conditions of the windshield is not possible with the conventional devices, in spite of the considerable cost of their construction.

It is an object of the present invention to provide a system for controlling the driving motor of a windshield wiper apparatus for selectively continuously or intermittently operating the windshield wipers, which system does not have the disadvantages of conventional systems of this kind and whereby, when the wipers are intermittently driven, the wiping intervals are adjusted in a simple manner in dependence on the conditions of the windshield automatically and without any action by the operator.

It is a further object of the invention to provide a system for controlling the motor driving the windshield wipers of an automobile according to the frictional resistance of the windshield against the movement of the wipers whereby the wipers are operated continuously when the windshield is very wet and offers very little resistance to the movement of the wipers, and are operated intermittently when the windshield is not very wet and offers greater resistance to the wiper movement, the extent of the intermissions being the greater, the drier the windshield. The system according to the invention is composed almost entirely of simple and/or conventional and/or commercially available elements, requiring little space and can be built into finished motorized vehicles.

A further object of the invention resides in the provision of a system for automatically switching on the motor driving the windshield wipers of an automobile, upon actuation of a windshield washing device, which system is of simple structure and can be built inexpensively and used in combination with almost any windshield wiper apparatus, particularly also with automatically controlled windshield wiper apparatus wherein the wipers are driven intermittently or continuously, and the operation of the driving motor is automatic and requires very little attention by the operator.

These objects are obtained by inserting a preferably adjustable resistance into the main current circuit of the wiper motor for producing a voltage drop and automatically cutting-in and cutting-out of the wiper motor in response to the frictional resistance of one or more wipers on the windshield, said adjustable resistance being connected to a controllable control element in the form of one or more transistors, triodes, vacuum tubes or the like, whereby a breaker contact inserted into the main circuit of the wiper motor for intermittent drive is operable directly or through suitable connecting devices by an impulse generator or the like for timing the intermissions.

When using a transistor as controllable control element, it is advisable to connect the base thereof to the adjustable resistance, the emitter thereof to the main current circuit of the wiper motor, and the collector of the transistor over the impulse generator to ground. It is also of advantage to insert into the current circuit of the wiper motor a throwover switch for continuous and intermittent operation, whereby the main switch of the wiper apparatus and/or the breaker contact can be bridged.

A bimetallic strip or the like which can be influenced by the controllable control element may be provided as impulse generator, which acts on the breaker contact directly or by way of one or more connecting devices which may be, for example, in the form of a relay. It is also possible to provide for the same purpose a solenoid which is energized by the controllable control element and preferably comprises a damping device, for example, a piston guided in a pressure cylinder, the solenoid actuating the breaker contact either directly or by means of a relay, a mechanism or similar device. An electric motor may be used as impulse generator, which motor influences a breaker contact preferably provided with a timing device, either directly or through a train of fears. An expansion wire or similar device which can be influenced by the controllable control element, may be provided as impulse generator which wire actuates the breaker contact directly or over suitable connecting devices.

It is of particular advantage to use a transistor or similar control element as breaker contact, the base of the transistor being connected by means of a contact which is influenced by the impulse generator, to the main current circuit of the wiper motor and the emitter and collector of the transistor being directly connected to said main current circuit. In this arrangement, one or more resistances, condensers and similar control elements should be associated, for example, as voltage dividers, with the transistor for setting the working point of the transistor, for setting the time constant when starting the wiper motor and/or for switching off the transistor.

An apparatus according to the invention for controlling the motor driving windshield wipers to operate the wipers selectively continuously or intermittently is particularly characterized by the fact that the extent of the wiping intermissions of the wipers at switched-on wiper motor is automatically adjusted in response to the conditions of the windshield to be cleared, without operation of a switch or the like by the operator. A resistance for effecting a voltage drop is arranged in the current circuit of the wiper motor, which resistance is connected to a controllable control element. A breaker contact for intermittent operation is also arranged in the main current circuit of the wiper motor and can be actuated by an impulse generator which times the intermissions. The wiper motor, if by the aforesaid throwover switch the position for intermittent operation is selected, is thus automatically switched on and off in response to the frictional resistance effected by the windshield to be cleared against the movement of the wiper. The intervals between switching-off and subsequent switching-on of the wiper motor which are equal to the wiping interruptions are automatically determined by the impulse generator and/or the connecting devices associated with the impulse generator.

The interruption of the wiper operation lasts longest when the windshield is dry or almost dry because the voltage drop effected by the resistance arranged in the main circuit, which resistance directly or indirectly determines the wiping intermission, is greatest, whereas the frictional resistance at greater rainfall onto the windshield to be cleared, diminishes, resulting in shorter wiping intermissions. At a certain precipitation the wiper operation is not interrupted because at slight friction of the windshield wiper the voltage drop is too small to actuate the impulse generator so that the latter does not operate the breaker contact. It is, of course, possible to adapt the individual elements of the system according to the invention, particularly the structure and reaction ability of the impulse generator and the connecting devices associates therewith and having a retarding effect, to individual conditions and requirements.

It is of advantage to provide the impulse generator for actuating the breaker contact of the wiper motor with an unstable, preferably adjustable multivibrator which acts through an associated switching relay or a similar control element on the breaker contact.

It is advisable to design the impulse generator as a low-frequency generator, to connect the reaction coil thereof through a condenser to the control element, and to arrange a rectifier between the secondary coil of the generator and the unstable multivibrator.

If a bimetallic strip which can be influenced by the controllable control element, is used as impulse generator, it is advisable to effect coaction of the generator through a switch with the unstable multivibrator.

For timing the unstable multivibrator in dependence on the voltage drop in the adjustable resistance, one or more condensers and preferably adjustable resistances may be associated with the unstable multivibrator.

An apparatus according to the invention for controlling the driving motor of a windshield wiper apparatus to effect selectively continuous and/or intermittent drive of the wipers does not only make it possible to adjust the extent of the wiping intermissions automatically according to the conditions on the windshield to be cleared without influencing the windshield wiping apparatus in any way by the operator, but also to assure exact performance of the switching operations. The unstable multivibrator associated with the impulse generator, which multivibrator may be provided with additional connecting devices according to modification requirements, makes operation possible without any disturbances, particularly also in combination with a low-frequency generator as impulse generator. The cost of the instant control arrangement is very low because commercially available parts can be use almost exclusively, which parts rare not only inexpensive but also require little space.

Windshield wiper apparatus and washing devices as used on motorized vehicles are frequently separated so that, when spraying the windshield to be cleared, operation of the wipers must be separately initiated. The operator must perform two consecutive manipulations, whereby his attention to steering may be impaired. It is known to connect to the actuating element of the washing device an additional switch with transmission elements for momentarily actuating the windshield wipers. These conventional devices are expensive and are not readily suitable for windshield wiper apparatus for selective continuous or intermittent operation of the wipers.

The invention provides a system wherein a contact element in the form of a switch or the like is inserted in the current circuit of the wiper motor; the contact element can bridge the main switch or a breaker contact for intermittent drive of the wipers, or a throwover switch associated herewith; an impulse generator is associated with the contact element whereby the impulse generator can control the contact element in response to operation of the washing device.

The aforementioned impulse generator preferably comprises an element which is responsive to the pressure of the washing water of the washing device and which acts on the contact element either directly or by way of intermediate devices.

The water-pressure-responsive element may comprise a diaphragm or the like stretched in a casing and exposed on one side to the water pressure. The diaphragm is operatively connected to the contact element. It is advisable to associate with the water-pressure-responsive element a valve, preferably an adjustable valve, throttle, or the like, placed in the conduit that leads to the casing wherein the diaphragm is located in order to retard the return of the pressure-responsive element to the initial position and to provide adequate operating time of the wipers.

Of particular advantage is the application of the described control system for operating the wiper motor in response to the operation of the washing device to an arrangement for the automatic control of the motor driving the wipers continuously and/or intermittently whereby the control system responsive to the operation of the washing device is coupled to said control arrangement so that the motor can be switched on in response to the operation of the washing device.

When said control system is coupled to said control arrangement, the contact element should be inserted in the side of negative polarity of the circuit of the control arrangement so that, when the contact element is actuated by the control system, the connecting device of the control arrangement influencing the breaker contact is directly connected to mass and the basis of the connecting device is grounded through a control conduit. It is advisable to insert a resistance for producing a voltage drop in the control conduit connecting the base of the connecting device associated with the breaker contact to the contact element.

A system according to the invention for automatic switching-on the driving motor of a windshield wiper apparatus when a windshield-washing device is started does not only facilitate operation of the wiper apparatus by the operator, but is also of very simple structure, reliable and inexpensive. It can be used in combination with almost any type of windshield-wiping apparatus. As a contact element is placed in the current circuit of the wiper motor by means of which the motor can be started by am impulse generator whenever the washing device is operated, it is made sure that, independently of the structure of the wiper apparatus, the wipers immediately and automatically perform wiping movements for clearing the windshield. The operator need only actuate the washing device if he wishes to initiate a brief operation of the wipers. The water sprayed onto the windshield reduces frictional resistance thereof and avoids damage to the wiper blades.

As the impulse generator of the control system is directly connected to the washing device and acts directly on the contact element, the arrangement takes very little space. Operating troubles are almost completely eliminated because the individual simple structural elements of the instant control system can be placed within the apparatus for driving the wipers. The proposed control system enables coordination of the wiping apparatus and the associated washing device without much expense, whereby the "on" periods of the wipers can be controlled automatically by means of the impulse generator to satisfy existing requirements.

If, upon coupling of the instant control system to a control arrangement for intermittent operation of the windshield wipers, the contact element and the switch commutator provided therefor are placed into the side of negative polarity of their circuit, the switching work is reduced and the operating reliability is increased. The starting current of the wiper motor does not flow through the contact element, but instead there flows therethrough only the considerably weaker control current of the control arrangement so that the control system must provide only little switching power for actuating the contact element.

The novel features which are considered characteristic of the invention are set forth with particularity in the appended claims. The invention itself, however, and additional objects and advantages thereof will best be understood from the following descriptions of embodiments thereof when read in connection with the accompanying drawing, wherein:

Figure 1:
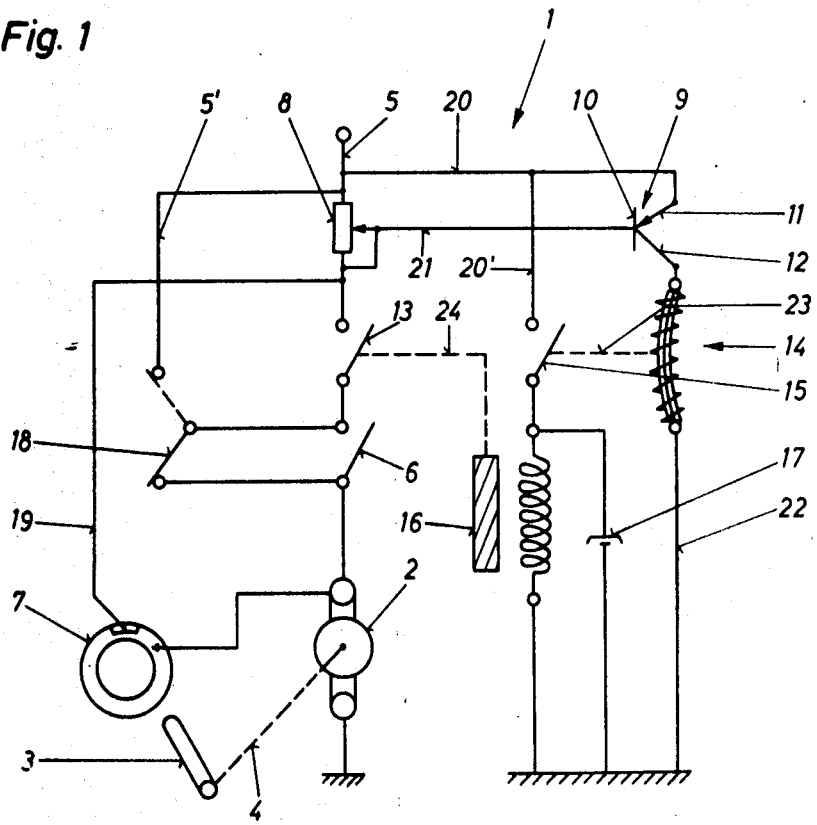
FIG. 1 is a wiring diagram of a system according to the invention using a bimetallic strip as impulse generator.

Referring more particularly to FIG. 1 of the drawing, a window wiper apparatus 1 comprises an arrangement for controlling a driving motor 2 to actuate selectively a window wiper of wipers 3 continuously or intermittently. Electric energy is thereby conducted through a circuit 5 which is controlled by a main switch 6, the wiper or wipers 3 being operatively connected to the motor 2 by conventional drive means indicated by a broken line 4. The switch 6 which may be formed by one or more contact bars (not shown) affords operation of the motor 2 at different speeds for driving the wipers at different wiping speeds. To effect switching off of the motor 2 in parking position of the wipers, a park contact switch 7 is associated in the conventional manner with the switch 6, the switch 7 being connected to the main circuit 5 by a conduit 19 in the conventional manner.

In order to be able to switch on and off the motor 2 automatically, a contact breaker 13 is placed in the circuit 5, which breaker is adapted to be influenced by an impulse generator 14. An adjustable resistance 8 is inserted into the main circuit 5 of the wiper motor 2 for actuating the impulse generator 14, the resistance 8 causing a voltage drop in response to the current consumption of the motor 2. The resistance 8 is associated with an adjustable switch means 9, which is connected to the impulse generator 14.

In the illustrated embodiment the adjustable switch means 9 is in the form of a transistor, the base 10 of which is connected to the adjustable resistance 8 through a conduit 21 and the emitter 11 which is connected to the main circuit 5 by a conduit 20. The collector 12 of the means 9 is grounded through a conduit 22. The pulse generator 14, which is in the form of a bimetallic strip, is inserted in the conduit 22. In lieu of a transistor, a similar electric switch element may be used by means of which the impulse generator can be actuated in response to the voltage drop caused by the resistance 8.

In order to act on the contact breaker 6, the impulse generator 14 is connected to a switch 15 by means of a lever 23 indicated by a broken line, the switch 15 being inserted in a conduit 20' by means of which a conduit 20 can be grounded directly. A relay 16 and a condenser 17 operating connected to the conduit 20' for compensating briefly occurring current surges whereby the contact breaker 13 is mechanically actuated by a diagrammatically shown lever 24.

If, by means of a throwover switch 18, which is inserted in a circuit 5' and may be coupled with the switch 6, switching from continuous operation to intermittent operation is effected and the switch 18 is moved to the illustrated position, current flows in the main circuit 5 through the adjustable resistance 8 and the closed contact breaker 13 to the wiper motor 2. When the switch 6 is closed and the throwover switch 18 is in the broken line position, the resistance 8 and the breaker contact 13 are shunted.

When increased frictional resistance of the wiper on a dry windshield causes a greater current consumption of the wiper motor 2 than when the windshield is wet, a voltage drop occurs in the adjustable resistance 8, which drop is conducted through the conduit 21 to the base 10 of the transistor forming the switch means 9. If the voltage in the base 10 increases above a predetermined value, namely above the working voltage of the transistor, passage of current from the emitter 11, which is connected to the main circuit 5 through the conduit 20, to the collector 12 is possible. Since the impulse generator 14 is inserted in the conduit 22 connecting the collector 12 to mass, the bimetallic strip bends and the impulse generator 14 reacts so that the switch 15 is closed.

If the switch 15 is closed, current is supplied to the relay 16 which, in that case, opens the contact breaker 13, whereby the main circuit 5 is broken. Since the contact breaker 13 is shunted by the conduit 19 and the switch 7, operation of the windshield wipers 3 is stopped only when the wipers are in parking position.

When the contact breaker 13 is open, no current flows in the resistance 8 and there is no voltage drop and no current is supplied to the pulse generator 14. Therefore, the pulse generator 14 formed by a bimetallic strip returns to its initial position after a certain time interval which must be determined by suitable design and which, more particularly, can be selected according to the flowing current, which depends on the voltage drop. For instance, when the windshield is dry, the resistance opposing the operation of the wiper 3 is considerable and the current consumption of the window wiper motor 2 and, therefore, the voltage drop in the resistance 8, are large. In this case the wiping intermissions are longest, whereas, at a drizzle, there are only brief wiping interruptions.

After the aforesaid time interval, which is defined by the pulse generator 14, the switch 15 is opened and the contact breaker 13 is closed by the relay 16 so that the circuit 5 is also closed and the wiper motor 2 is automatically started. At intermittent operation the windshield wipers 3 are automatically stopped, depending on the voltage drop caused by the resistance 8 and, therefore, according to the respective frictional resistance produced by the wind shield to be wiped, during time intervals adapted to the respective operating conditions.

Figure 2:
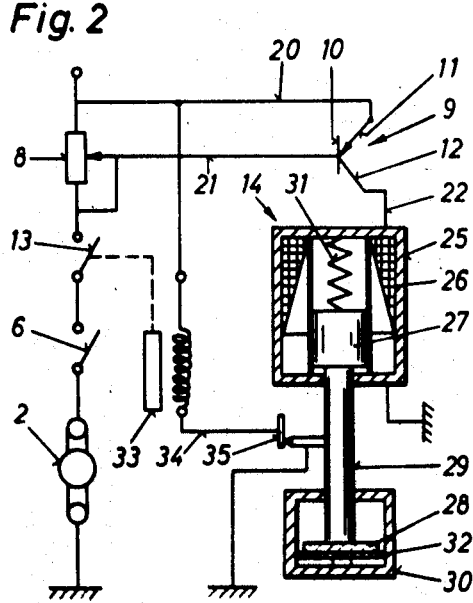
FIG. 2 is a wiring diagram of a system substantially as shown in FIG. 1 wherein, however, a solenoid is used as impulse generator, the solenoid being illustrated in section and schematically.

In the embodiment of the invention diagrammatically illustrated in FIG. 2, the impulse generator 14 is in the form of a solenoid 25, to the coil 26 of which current is transmitted from the collector 12 of the transistor 9 through the conduit 22. The armature 27 of the solenoid 25 is connected through a piston rod 29 to a piston 28 that is slidable in a cylinder 30 filled with a fluid. The piston 28 is provided with a sleeve 32 for retarding the return motion effected by a spring 31. A contact 35 is connected to the piston rod 29 for connecting a relay 33, actuating the contact breaker 13, through a conduit 34 to the conduit 20 and thereby to the source of current.

When, due to a voltage drop produced by the resistance 8, current is admitted to the coil 26 of the solenoid 25, the armature 27 of the latter and the piston 28 connected therewith are moved upward against the action of the spring 31 so that the contact 35 is closed. Thereby, the contact breaker 13 is opened by the relay 16 and the motor 2 is stopped.

In order to delay the return of the piston 28 and the closing of the contact breaker 13, the piston 28 is provided with the sleeve 32 which acts as a throttle when the piston is returned and only slowly permits the flow of fluid into the upper cylinder space.

Figure 3:
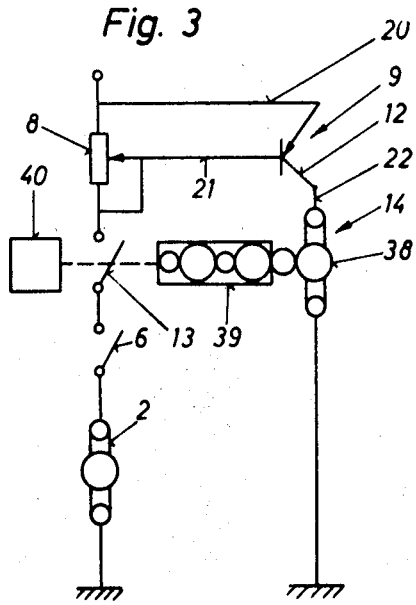
FIG. 3 is a wiring diagram of a system substantially as shown in FIG. 1 wherein an electric motor with gear train is used as impulse generator.

In the embodiment of the invention diagrammatically shown in FIG. 3, an electric motor is provided as pulse generator 14 which acts on the contact breaker 13 by means of a gear drive 39. This arrangement assures that the contact breaker 13 is not opened before the contacts of the interval switch 7 are out of the parking position so that at least one wiping motion is effected. In this embodiment of the invention it is of advantage to associate a diagrammatically shown time switch 40 with the contact breaker 13 whereby, for example, by means of spring action the breaking of the contact 13 and thereby the wiping intervals are adjustable in response to the setting of the drive 39.

Figure 4:
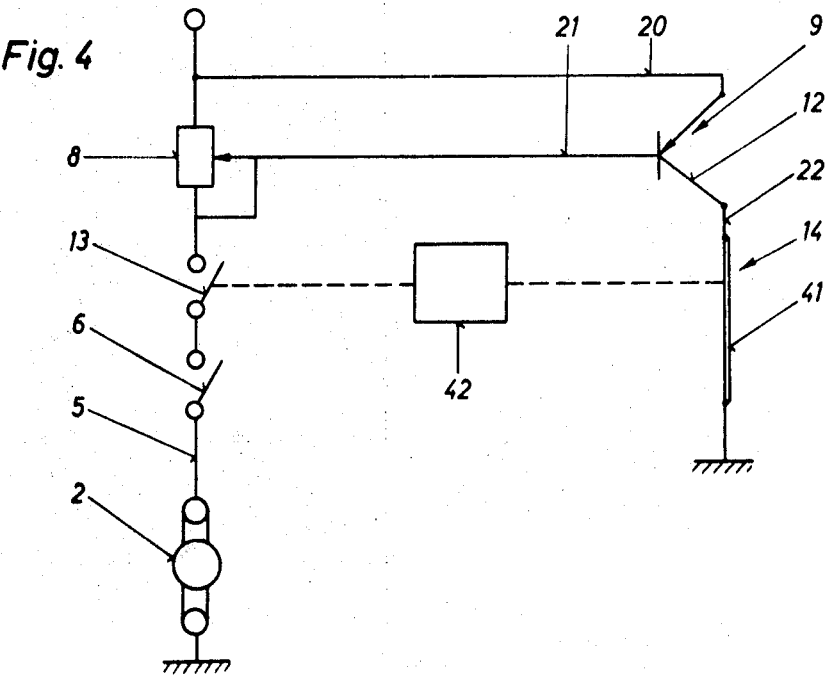
FIG. 4 is a wiring diagram of a system according to the invention wherein an expansion element is used as impulse generator.

In the embodiment diagrammatically shown in FIG. 4, the impulse generator 14 comprises an expansion wire 41 which acts on the contact breaker 13 through a connecting device 42 for timing the breaking of the contact 13 and for timing the wiping intermissions. When current flows from the collector 12 of the transistor 9 through the conduit 22 to ground, the wire 41 is heated and thereby elongated so that the contact breaker 13 is actuated directly or through the connecting device 42, according to the voltage drop in the resistance 8.

Figure 5:
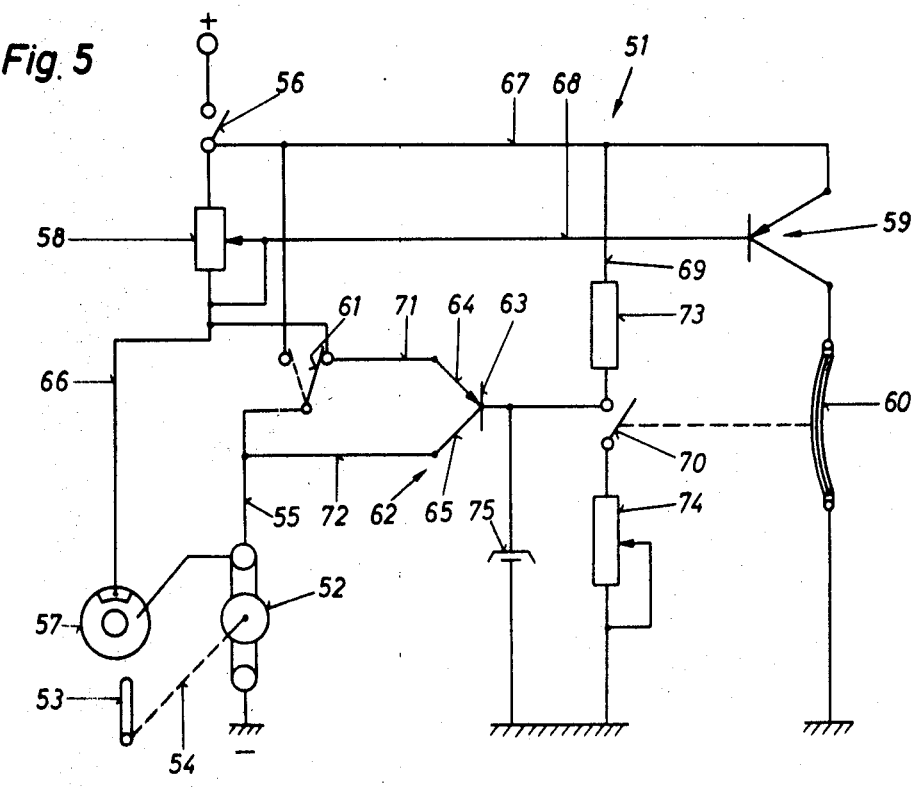
FIG. 5 is a wiring diagram of a modified system according to the invention.

The wiring diagram shown in FIG. 5 of an arrangement 51 for controlling a wiper drive motor 52 for selectively driving wipers 53 continuously or intermittently through a schematically shown drive means 54, is similar to that shown in FIG. 1, with the exception that a contact breaker 62 is also formed by a transistor. The base 63 of the transistor 62 is connectable through a conduit 69 and a resistance 73 by means of a switch 70 to a conduit 67 extending to an adjustable connecting device 59 and to a main circuit 55. The emitter 64 is connected to the main circuit 55 through a conduit 71; and the collector 65 is connected to the main circuit 55 through a conduit 72. There is also a main switch 56, a parking contact switch 57 connected to the main circuit 55 through a conduit 66, an adjustable resistance 58, a throwover 61 for continuous or intermittent operation, and an impulse generator 60 capable of being influenced by the adjustable connecting device 59.

If the switch 61 is set for intermittent operation, as shown in FIG. 5, and, due to an increased frictional resistance of the wiper 53, a voltage drop occurs in the resistance 58 owing to increased current consumption of the motor 52, the voltage drop is conducted through the conduit 68 to the adjustable connecting device 59, and the impulse generator 60 formed by a bimetallic strip is influenced by the connecting device 59 in the manner described above. The switch 70 is thereby opened so that the base 63 of the transistor 62 is no longer connected to the main circuit through the conduit 69 wherein resistances 73 and 74 are inserted for setting the working point of the transistor. Thereby, the current flow from the emitter 64 to the collector 65 and to the wiper motor 52 is interrupted and the latter is stopped in parking position of the wipers 53 for a short time until the bimetallic strip returns to its initial position and the switch 70 is once more closed.

The purpose of the condenser 75 connected to the base 63 of the transistor 62 is to conduct current to the motor 52 at a temporarily increased current consumption of the motor 52 and therefore at a brief opening of the switch 70, at least until the contacts of the parking contact switch 57 have left the parking position so that at least one wiping operation is effected.

Figure 6:
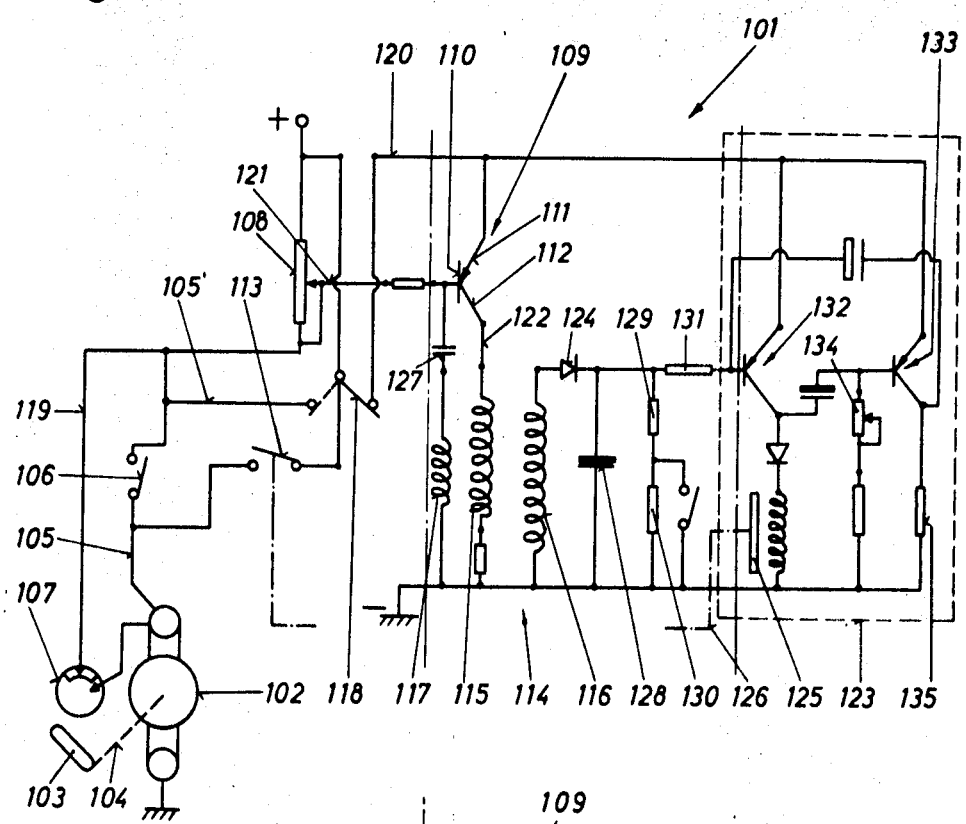
FIG. 6 is a wiring diagram of a further modification of the system according to the invention.

FIG. 6 is a diagrammatic illustration of a system 101 for controlling the driving motor of a windshield wiper arrangement for selectively driving wipers 103 continuously or intermittently, whereby a motor 102 receives electric energy through a main circuit 105 controlled by a switch 106. The wipers 103 are connected to the motor 102 by means of a driving mechanism 104 indicated by a broken line.

The switch 106, which may be formed by one or more contact bars (not shown), affords operation of the motor 102 at different speeds for driving the wipers at different wiping speeds. To effect switching off of the motor 102 in parking position of the wipers, a parking contact switch 107 is associated in the conventional manner with the switch 106, the parking switch 107 being connected to the main circuit 105 by a conduit 119 in the conventional manner.

In order to be able to switch on and off the motor 102 automatically, a contact breaker 113 is placed in the circuit 105, which breaker is adapted to be influenced by an impulse generator 114. An adjustable resistance 108 is inserted into the main circuit 105 of the wiper motor 102 for actuating the impulse generator 114, the resistance 108 causing a voltage drop in response to the current consumption of the motor 102. The resistance 108 is associated with an adjustable switch means 109 which is connected to the impulse generator 114.

In the illustrated embodiment, the adjustable switch means 109 is in the form of a transistor, the base 110 of which is connected to the adjustable resistance 108 through a conduit 121 and the emitter 111 of which is connected to the main circuit 105 by a conduit 120. The collector 112 of the transistor switch means 109 is grounded through a conduit 122. The pulse generator 114 is inserted in the conduit 122.

The impulse generator 114 is in the form of a low frequency generator that includes a primary coil 115 connected to a collector 112 of the switch means 109, a secondary coil 116, and a reaction coil 117 with associated condenser 127 for producing an alternating voltage. An unstable multivibrator 123 is connected to the secondary coil 116 of the low-frequency generator through a rectifier 124. A switch relay 125 of the multivibrator 123 acts on a breaker contact 113 through a conduit 126 shown by a broken line.

When, by means of a throwover switch 118 inserted in the circuit 105 and coupled with the switch 106, if desired, a changeover from continuous operation to intermittent operation is effected and the switch 118 is moved to the illustrated position, current flows in the main circuit 105 through the closed breaker contact 113 to the motor 102.

When increased frictional resistance of the wiper on the dry windshield causes a greater current consumption of the wiper motor 102 than when the windshield is wet, a voltage drop occurs in the adjustable resistance 108, which drop is conducted through the conduit 121 to the base 110 of the transistor that forms the switch means 109. If the voltage in the base 110 increases above a predetermined value, namely above the working voltage of the transistor, passage of current from the emitter 111, which is connected to the main circuit 105 through the conduit 120, to the collector 112 is possible. Since the impulse generator 114 is inserted in the conduit 122 connecting the collector 112 to ground, the impulse generator 114 reacts.

Since the impulse generator 114 is in the form of a low-frequency generator, voltage is produced in the primary coil 115 thereof, which voltage depends on the momentary voltage drop in the adjustable resistance 108 and is zero or small at a small voltage drop and is large at a large voltage drop.

The low-frequency voltage is transformed in the secondary coil 116 of the generator 114 and is rectified by the rectifier 124. An additional condenser 128 is charged with direct current during one wiping operation and is discharged through resistances 129 and 130. This stage is connected by means of a resistance 131 to the modified unstable multivibrator 123, which is provided with transistors 132 and 133. The multivibrator 123 is so modified that the switching relay 125 reacts automatically within a trip period which can be adjusted by means of a resistance 134.

At intermittent operation, the contact breaker 113 is temporarily closed by the switching relay 125 so that current is conducted through the motor 102 and the latter is started. After switching off the relay 125, the operating current flow through the parking contact switch 107 and the adjustable resistance 108, and the wiper 103, which is operatively connected to the motor 102, performs a wiping operation.

If the windshield to be cleared is relatively dry, a larger voltage drop is effected in the adjustable resistance 108 due to the increased current consumption of the wiping motor 102 than if the window were wet. Therefore, the low-frequency generator 115, 116 produces a high voltage while the condenser 128 is highly charged. The high positive voltage is at the base of the transistor 132 so that the unstable multivibrator 123 is blocked until the condenser 128 is discharged through the resistances 129 and 130 to the battery voltage. If this condition is obtained, tipping or switching occurs again in the multivibrator 123, that means, the switch relay 125 actuates the breaker contact 113 so that the wiping interval is finished and the operation is repeated.

If in the meantime, the windshield has become more wet due to rain, the wiper motor 102 takes less current and the voltage drop in the adjustable resistance 108 is reduced. Therefore, a smaller voltage is generated by the generator 115, 116 so that the intervals between the wiping operations are also reduced. The resistance 135 makes it possible to influence the discharging time for effecting a short or long interval range.

Figure 7:
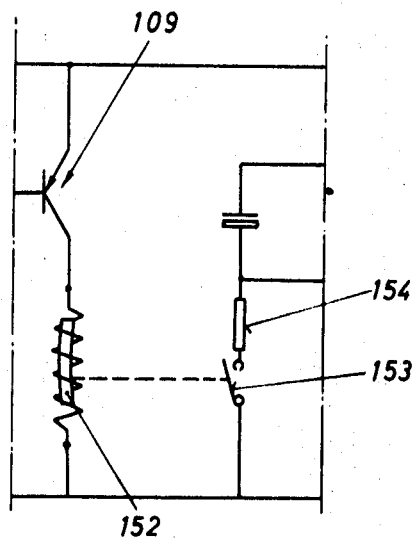
FIG. 7 is a schematic illustration of a modified portion of the system shown in FIG. 6.

In the arrangement 151 diagrammatically partly shown in FIG. 7, wherein the parts not shown are like the corresponding parts shown in FIG. 6, a bimetallic strip 152 is connected as impulse generator to the switch element 109 in lieu of the low-frequency generator 114. The bimetallic sip 152 is coupled with a switch 153 whereby a discharge resistance 154 associated with the unstable multivibrator is either connected to or disconnected from ground. If the switch 153 is opened due to bending the bimetallic strip 152, which bending depends on the current reception of the adjustable resistance 108, the timing of the unstable multivibrator is interrupted so that no wiping is effected until the switch 153 is closed again.

Figure 8:
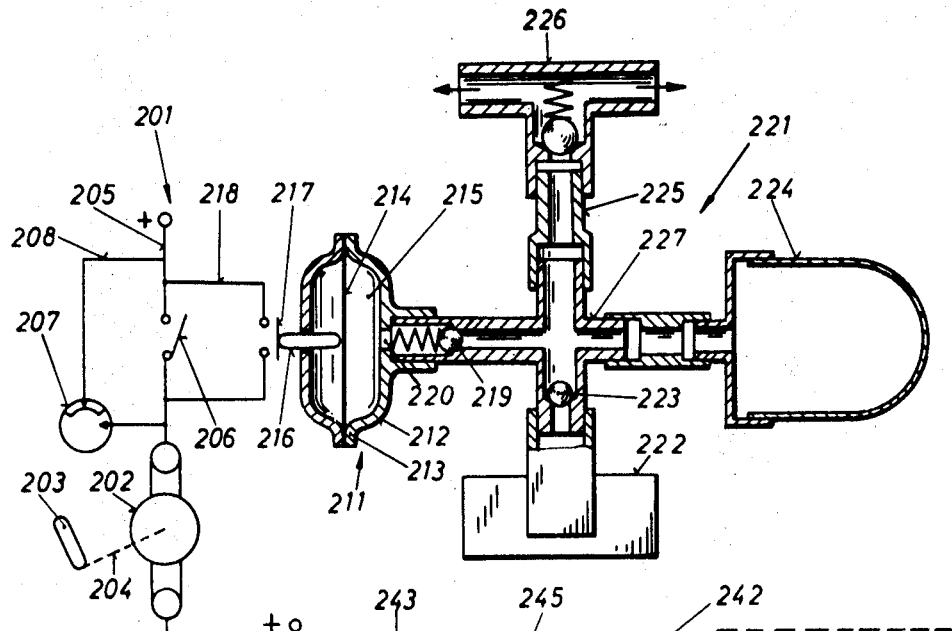
FIG. 8 is a schematic part sectional illustration of a further modification of the system according to the invention.

The arrangement 211 shown in FIG. 8 for automatic starting of windshield wipers 203 of an automobile is associated with a windshield wiper plant 201 and a windshield washing device 221. The plant 201 comprises an electric motor 202 for driving wipers 203 through a conventional drive mechanism 204, a switch 206 being provided in the motor circuit 205 for starting the motor 202. This switch 206, when open, can be shunted by a parking contact switch 207 and a conduit 208. The windshield wiper 203, is therefore always stopped in parking position when the motor 202 is switched off.

The arrangement 211 for automatic starting of the motor of a windshield wiper plant 201 when the windshield-washing device 221 is operated comprises means for coupling the wiper plant 201 with the windshield-washing device 221, said means consisting of a pulse generator 212, which acts on a contact 217 interposed in a conduit 218 of the wiper motor 202. The pulse generator 212 is connected to the washing device 221 by a cross element 227. The pulse generator 212 is provided with a diaphragm 214 that is stretched in a casing 213 and adapted to actuate the contact 217 through an intermediate element 216 in response to the pressure in a chamber 215 formed by the casing 213. The pressure in the chamber 215 is produced by a pressure generator 224 of the washing device 221 which is connected to the pressure chamber 215. Delaying devices in the form of a valve 219 and/or a throttle orifice 220 may be associated with the pulse generator 212 in order to retard the pressure drop in the chamber 215.

The washing device 221 is started by suitably charging the pressure generator 224 in order to supply water from a container 222 through a valve 223, the cross element 227, a conduit 225 and through a distributor 226 to spray nozzles (not shown). The valve 219 will thereupon open due to the rising pressure, and pressure is produced in the chamber 215 of the impulse generator 212. This pressure causes the diaphragm 214 and the intermediate element 216 connected to or adjacent to the diaphragm to move to the left, as seen in FIG. 8, so that the contact 217 and the line 218 are closed and the open switch 206 is shunted. Therefore, the motor 202 receives current and is started and the wipers 203 are operated.

The line 218 stays closed and the motor 202 remains switched on as long as the diaphragm 214 of the impulse generator 212 is in a suitable position which is determined by the pressure in the chamber 215. The pressure drop in the chamber 215 can be retarded as required by means of the valve 219 and/or the orifice 220 arranged in the feed pipe connected to the chamber 215, so that operation of the wipers 203 according to the pressure generated in the chamber 215 and therefore indirectly according to the amount of sprayed water and/or according to the manner how this pressure is produced, is assured also after disconnection of the washing device 221. If little water is sprayed on the pane to be cleared, the wipers 203 will execute merely one wiping motion. When much water is supplied by the washing device, however, the wipers 203 will reciprocate several times before they are automatically stopped in parking position.

Figure 9:
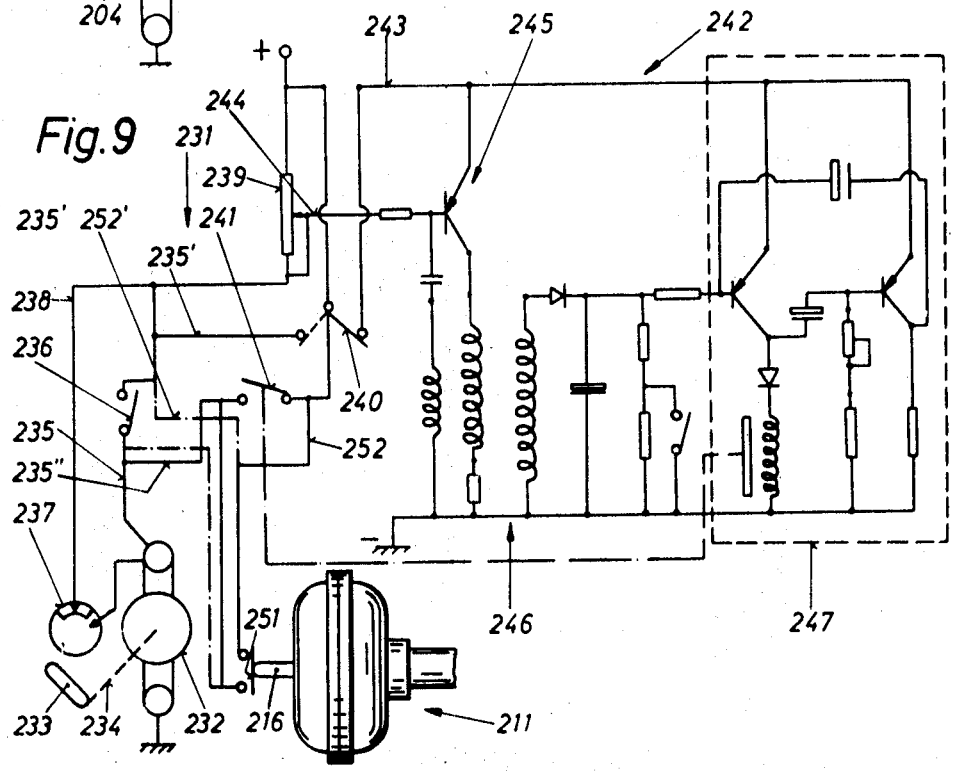
FIGS. 9 and 10 are wiring diagrams of two further modifications of the system according to the invention.

In the embodiment of the invention diagrammatically shown in FIG. 9, a control device 242 for controlling a driving motor 232 for selectively operating wipers 233 continuously or intermittently is associated with a windshield wiping apparatus 231. A washing device 221 (not shown in FIG. 9) and an arrangement 211 are connected for automatically switching on the driving motor 232 of the wiping apparatus 231. This switching-on is accomplished by actuating the windshield-washing device 221 according to FIG. 8 (wherein, however, only the pulse generator 212 and its axially movable element 216 are illustrated). A main switch 236 is connected in the supply line 235 of the driving motor 232. The main switch can be bridged by a parking contact switch 237 and a conduit 238. Furthermore, an adjustable resistance 239 is disposed in the current supply line 235. The motor 232 is operatively connected by drive means 234, indicated by a broken line, to the windshield wipers 233.

The adjustable resistance 239 acts on a control arrangement 242 which includes a switch element 245, a pulse generator 246 and an unstable multivibrator 247, and which is connected to the wiper apparatus 231 by lines 243 and 244. In addition, a selector switch 240 is provided in a line 235' for switching from continuous to intermittent operation. A switch 241 is provided in a line 235'', the switch 241 being actuated by the control arrangement 242.

The pulse generator 212 of the arrangement 211 provided for coupling the washing device 221 (not shown in FIG. 9) with the wiper apparatus 231, acts on a contact element 251 by means of which the switch 241 can be bridged by a conduit 252. It is, of course, also possible to bridge the main switch 236 by means of a conduit 252', as shown by a dash-dot line.

When the washing device 221 is started, current is supplied to the wiper apparatus 231, namely to the wiper motor 232 as the switches 241 and 236 are bridged by the contact element 251. The wipers 233 are actuated, regardless of whether or not the wiper apparatus 231 is switched on, the control device 242 switched on, and immediately execute one or more wiping motions. The number of wiping motions is determined by the water pressure in the pressure chamber 215 of the pulse generator 212 as it is in the embodiment shown in FIG. 8, whereas at intermittent operation the number of wiping motions depends on the voltage drop effected by the adjustable resistance 239, which voltage drop depends on the frictional resistance of the windshield. The switching element 245 is controlled by the adjustable resistance 239 and the pulse generator 246 and the unstable multivibrator 247, which acts on the breaker contact 241, are controlled by the switching element 245.

Figure 10:
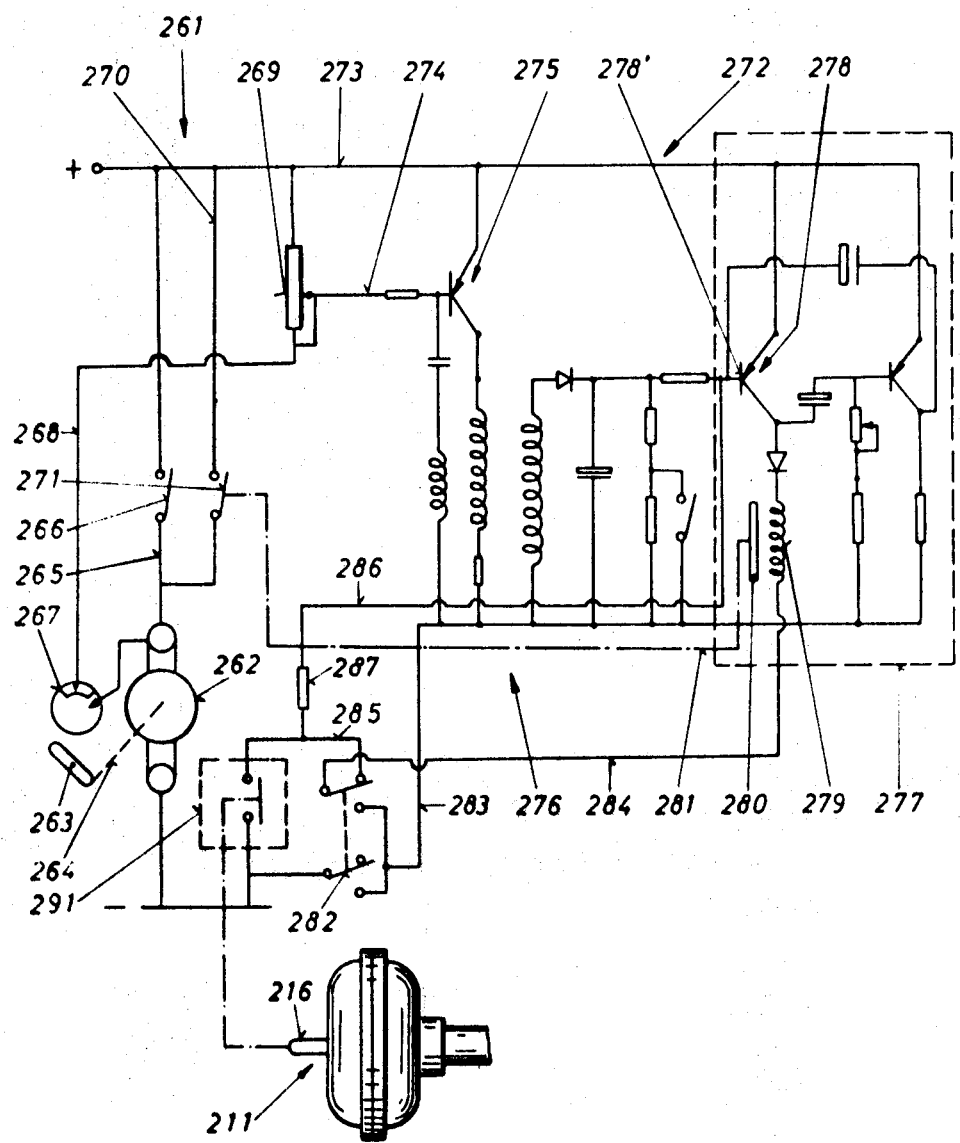

At continuous operation, current is supplied to the windshield wiper apparatus 261 shown in FIG. 10 and to the wiper motor 262, which is connected to the wipers 263 by a power-transmitting mechanism 264, through a line 265 and a closed main switch 266. A parking contact switch 267, which is connected to a source of current by a conduit 268 wherein an adjustable resistance 269 is inserted, makes sure that the wipers 263 are in parking position, when switched off.

A double commutation switch 282 is provided for actuating a control device 272 for intermittently driving the wipers 263, the control device 272 being connected through lines 273 and 274 to the circuit 265, 268 and formed by a switch element 275, a pulse generator 276 and an unstable multivibrator 277. The switch 282 is placed in the line 283 at the side of negative polarity of the control device 272, the individual switch elements of the control device 272 being grounded when the switch 282 is closed.

The switch 282 can be bridged in the illustrated position by a line 285 wherein a contact element 291 is provided which can be influenced by the switching arrangement 211, as the line 285 is connected to the line 284 by the switch 282. Furthermore, a control conduit 286 is provided that has a resistance 287 for producing a voltage difference and branches from the line 285. The base 278' of the switch element 278 of the unstable multivibrator can be grounded by means of the control conduit 286.

When the control device 272 is switched on, current is conducted to the driving motor 262 through the line 270 for intermittent operation, whereby a breaker contact is temporarily closed. The breaker contact 271 is connected by mechanical means 281 (shown by a dash-dot line) to an adjustable element 280 of a relay 279 so that the breaker contact 271 is closed when the relay 279 is energized.

If, at arrested wipers 263, the washing device 221 is started and water is sprayed onto the windshield, a contact element 291 is moved by the arrangement 211 and the line 285 is grounded. Thereby the relay 279 is also grounded through the conduit 284 so that the switch element 278 acts as a switching transistor and adjusts the element 280 of the relay 279, and the breaker contact 271 is immediately closed. Current can therefore flow to the driving motor 262 immediately after starting the washing device 221 and the wipers 263 perform one or more wiping motions according to the pressure rise and pressure drop in the pulse generator 212.

If the control device 272 is switched on, whereby the switch 282 must be moved to the opposite position and, if there is an operating interval when starting the washing device 221, the switch element 278 immediately becomes a switching transistor because the base 278' of the switch element 278 is also grounded through the control conduit 286. The resistance 287 interposed in the control conduit 286 effects a voltage difference between the basis 278' and the emitter of the switch element 278 so that the relay 279 is energized and the breaker contact 271 is immediately closed and the operating interval is concluded. Due to the arrangement of the contact element 291 in the negative side of the circuit of the control device 272, wiper motions are immediately effected at any operating condition when the control device 272 is actuated by the washing device 221.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A system for wiping the windshield of an automobile, comprising:
   a wiper,
   a main electric circuit including
   a direct current source and
   a motor operatively connected to said wiper for driving said wiper,
   a resistance for producing a voltage drop when the current consumption of said motor increased due to increased frictional resistance of the windshield to movement of said wiper,
   first switch means connected to said resistance and actuated by said voltage drop, second switch means in series with said motor,
   timing or time-delay means actuated by said first switch means for controlling said second switch means,
   said timing or time-delay means including an unstable multivibrator having a switch relay associated therewith and actuating said second switch means.

2. A system as defined in claim 1 wherein said resistance is adjustable.

3. A system as defined in claim 2, said main circuit comprising a main switch connected in series with said second switch means and park switch means connecting the arm of said adjustable resistance to said motor for varying the speed of said motor by said adjustable resistance.

4. A system according to claim 1 wherein said timing or time delay means further comprises a low-frequency generator coupled to said first switch means.

5. A system as defined in claim 1 wherein said first switch means is in the form of a transistor having a base connected to said resistance, an emitter connected to one pole of said source in said main circuit, and a collector connected to the opposite pole of said source and coupled to said timing or time-delay means.

6. A system according to claim 5 wherein said timing or time-delay means comprises a reaction coil, a condenser connected between said reaction coil and said base, a primary coil series connected to said collector, a secondary coil coupled to a rectifier, and timing condenser-resistor circuit means connected between said rectifier and said unstable multivibrator.

7. A system as defined in claim 1, said main circuit further comprising a throwover switch bridging said second switch means and said resistance for selecting continuous and intermittent operation of said motor, respectively.

8. A system according to claim 1 wherein said timing or time-delay means further comprises a bimetalic switch connected to and influenced by said first switch means to control said unstable multivibrator.

9. A system according to claim 6 wherein at least one condenser and at least one adjustable resistance are associated with said unstable multivibrator for adjusting the impulse time according to the voltage drop in said resistance.